United States Patent [19]

Parlo

[11] Patent Number: 5,429,393
[45] Date of Patent: Jul. 4, 1995

[54] IDENTIFICATION TAG

[75] Inventor: Daniel J. Parlo, Santa Barbara, Calif.

[73] Assignee: D & D Enterprises, Santa Barbara, Calif.

[21] Appl. No.: 268,784

[22] Filed: Jun. 30, 1994

[51] Int. Cl.$^6$ .............................................. B42D 15/00
[52] U.S. Cl. ...................................... 283/75; 283/108; 283/109; 40/299; 40/300
[58] Field of Search .................. 285/74, 75, 108, 109, 285/901; 40/299, 300, 301

[56] References Cited

U.S. PATENT DOCUMENTS

| | | | |
|---|---|---|---|
| 2,297,285 | 9/1942 | Bledsoe | 40/17 |
| 3,100,172 | 8/1963 | Nier | 156/228 |
| 4,043,858 | 8/1977 | Dantowitz | 156/251 |
| 4,178,879 | 12/1979 | Cunningham | 119/106 |
| 4,215,497 | 8/1980 | Levy | 40/10 |
| 4,222,662 | 9/1980 | Kruegle | 283/109 X |
| 4,275,518 | 6/1981 | Martin | 40/324 |
| 4,276,704 | 7/1981 | Heller | 40/159 |
| 4,618,516 | 10/1986 | Sager | 428/35 |
| 4,795,511 | 1/1989 | Wouters et al. | 156/73.1 |
| 4,984,683 | 1/1991 | Ellen | 283/75 X |
| 5,074,593 | 12/1991 | Grosso | 283/109 X |
| 5,148,618 | 9/1992 | Brewster | 40/626 |

FOREIGN PATENT DOCUMENTS

| | | |
|---|---|---|
| 1367936 | 6/1964 | France . |
| 2444290 | 9/1974 | Germany . |
| 1203734 | 9/1970 | United Kingdom . |

*Primary Examiner*—Willmon Fridie
*Attorney, Agent, or Firm*—Marvin E. Jacobs

[57] ABSTRACT

An identification tag is manufactured by driving a toner printer or color printer with a word processing and graphics programmed computer to print identification indicia in the form of toner or color characters and optional graphics indicia fused to a surface of a transparent sheet. Die cutting the printed sheet and a highly contrasted sheet such as a sheet with specular reflection to the shape of a cavity. Stacking the sheets in the cavity with the transparent sheet above the other sheet and sealing the cavity with a transparent cover such as by sonic welding a polycarbonate enclosure.

20 Claims, 2 Drawing Sheets

IDENTIFICATION TAG

CROSS-REFERENCE TO DISCLOSURE DOCUMENT

The present invention was disclosed in Disclosure Document No. 341617.

TECHNICAL FIELD

The present invention relates to identification tags and, more particularly, this invention relates to a novel animal identification tag and to a method of imprinting and assembling the tag.

BACKGROUND OF THE INVENTION

The identification (I.D.) tag of the invention can be also used for identifying luggage, cameras, etc. However, the largest market and impetus for the locket-type I.D. tag is for use as a pet I.D. tag. Though the following history is devoted to the pet I.D. tag, it is understood that the I.D. tag of the invention has other uses.

Prior to 1972, pet identification tags consisted solely of machine engraved, metal medallions of different shape, size and material. Stainless steel, anodized aluminum and brass were the principal materials used.

In 1972, the assignee of the present application introduced the first machine engraved plastic tags. The material used was 3-ply, NAZIS, "engraver's plastic" such as had been previously used for engraving trophy plaques, desk name plates, instrument panels, etc. Essentially, the material consists of a thick plastic core with thin sheets of plastic of a contrasting color laminated to each side of the core. One would engrave through the thin outer laminate to reveal the contrasting core. Such a material is made by Romark, Inc. and comes in 2'×4' sheets of various thicknesses. The material is available in a variety of colors and surface effects (eg. woodgrain). Because of the structure of the material, tag shapes could not be injection molded; instead, they had to be cut from the sheet. Because of this requirement and the unsophisticated method employed, up to 60% of the sheet was wasted. For the first 15 years of business, the plastic tag line consisted of three size circular discs, each in 5 colors; in other words, 15 plastic products. As business improved, special dies for cutting the shapes were developed. This helped reduce stock wastage. In 1980, a computer controlled engraving machine was purchased. Even though this machine was expensive ($50,000), productivity was improved to such an extent that the business grew exponentially for the next 8 years.

In 1988, the price of computer controlled engraving machines began to drop. Today, such a machine costs only 1/6 of what it did in 1980. This encouraged several competitors to enter the plastic pet tag business. Since the market for pet tags is at any time finite (or at least only growing slowly), the only way to gain market share was through price cutting or offering more variety. The second option was generally adopted. In order to try to maintain market share, new shapes, sizes and colors of engraved plastic tags were added to the line. At present, the plastic product line consists of 219 items, all differing in size, shape or color. Because the market is finite, the greater the variety of tags means that any specific tag is produced in fewer numbers. For most shapes, the numbers involved do not warrant investing in sophisticated dies nor machinery (ie. laster cutters) for economical blanking of parts. Consequently, less efficient methods are used with the result that stock wastage has increased. This comes at a particularly bad time with the present concern over bulk waste disposal of materials that do not degrade such as plastics. Another drawback, is increased inventory, both of raw stock due to more colors and finished blanks, due to more sizes, shapes and colors. Finally, the above business expansion scenario is ultimately limited by the finite number of available raw stock options and those shapes which are appropriate to the pet tag business.

Therefore, there is a clear need for a new pet identification tag and a method of manufacturing the tag that reduces inventory, waste and cost but produces an attractive I.D. tag with a unique appearance and is easily customized to provide a variety of appearances.

STATEMENT OF THE PRIOR ART

A "tear drop" shaped, snap together, two piece encapsulating device is disclosed in Delacroix (France 1,367,936). The device is intended for enclosure of a photo, document, souvenir, etc. A tamper proof encapsulating device of Heller (U.S. Pat. No. 4,276,704) is used in I.D. or credit card manufacture.

Brewster (U.S. Pat. No. 5,148,618) discloses a sealed tag for providing bar code labels in a radiation environment.

The tag includes, a two part, injection molded, polycarbonate encapsulating device which is strong, U.V. resistant, possesses two viewing faces and which contains a recess in one of the parts to receive indicia bearing labels. The plastic parts of Brewster incorporate features to promote ultrasonic welding of the parts and preferably the employment of ultrasonic welding to achieve a hermetic seal. Also, through holes are provided around the perimeter of the package, but, exterior to the hermetic seal, for attachment of the tag.

Cunningham (U.S. Pat. No. 4,178,879) utilizes a tubular, transparent pet collar with an elongated cross-section. An opaque, indicia bearing slip may be inserted through a slot and down the length of the collar. Stickyback indicia may be installed onto the slip. Also, additional sticky-back indicia of a decorative nature may also be installed onto the slip. Levy (U.S. Pat. No. 4,215,497) provides a heart shaped package, similar in construction to Brewster, but which involves a third, lock-in insert incorporating a material that can be written on by the user.

Both Levy and Winston (Great Britain 1,203,734) intend a dual purpose for their tags. Both intend to have one side for viewing written information whereas, the other side serves as a reflector of one sort or another. The intent of this second attribute is to promote the visibility of the tag at a distance thereby allowing the animal wearing it to be seen by, for example, a motorist.

STATEMENT OF THE INVENTION

The present invention provides an identification tag that is readily manufactured with low waste in a large variety of visual forms. The invention utilizes commercially available materials and apparatus to provide customized tags having dramatic visual effects. The tag is manufactured from light weight, low volume materials. Both inventory and waste of materials are significantly reduced.

The tag of the invention comprises in combination an exterior enclosure having at least one transparent face, a cavity in the enclosure under the transparent face for receiving a plurality of films. One of the films has transparent regions and includes machine imprinted indicia including identification data and a second film underlying the first film is opaque and preferably containing highly contrasted, highly colored designs.

The enclosure is preferably formed of 2 mating pieces formed of a transparent thermoplastic resin that can be hermetically sealed to protect the tag from exposure to rain and sun. The resin may also contain ultraviolet stabilizers to absorb ultraviolet radiation and prevent deterioration of the enclosure. The cavity can be any shape such as circular. A triangular extension having an aperture may be attached to the cylindrical enclosure for receiving a lead or leash to attach the tag to a collar or to a piece of luggage. This results in the enclosure having the well-known "tear drop" shape.

The cavity preferably includes a registration means such as a flat edge portion on a circular shape in order to properly align the indicia disc to the enclosure. The background contacting disc may also have an axis to be aligned such as a photograph and the die cut will align the photograph correctly. The die cut discs with corresponding flat edges are more readily assembled into proper position in the cavity.

The indicia can be printed on either the top or bottom surface of the transparent film. However, printing on the top surface is more compatible with standard printing machinery. Furthermore, the separation in space allows more light to reach the underlying contrasting surfaces, especially fluorescent or reflective surfaces provided on both sides of the enclosure. At nighttime the tag can also act as a safety reflector for children or animals catching and reflecting the headlights from automobiles or trucks. Furthermore, printing directly onto reflective foils would block a part of the reflective surface. Printing directly onto intricate patterns or photographs also obscures a portion of the design.

In summary, the tag of the invention allows use of more intricate designs, bright and reflective materials combined with legible, easily readable identification indicia working in cooperation with the background colors or designs. The tag of the invention can have indicia and designs on both faces increasing the amount of data that can be imprinted and providing highly colored reflective from both faces of the disc.

These and many other features and attendant advantages of the invention will become apparent as the invention becomes better understood by reference to the following detailed description when considered in conjunction with the accompanying drawings.

DETAILED DESCRIPTION

Figure 1:
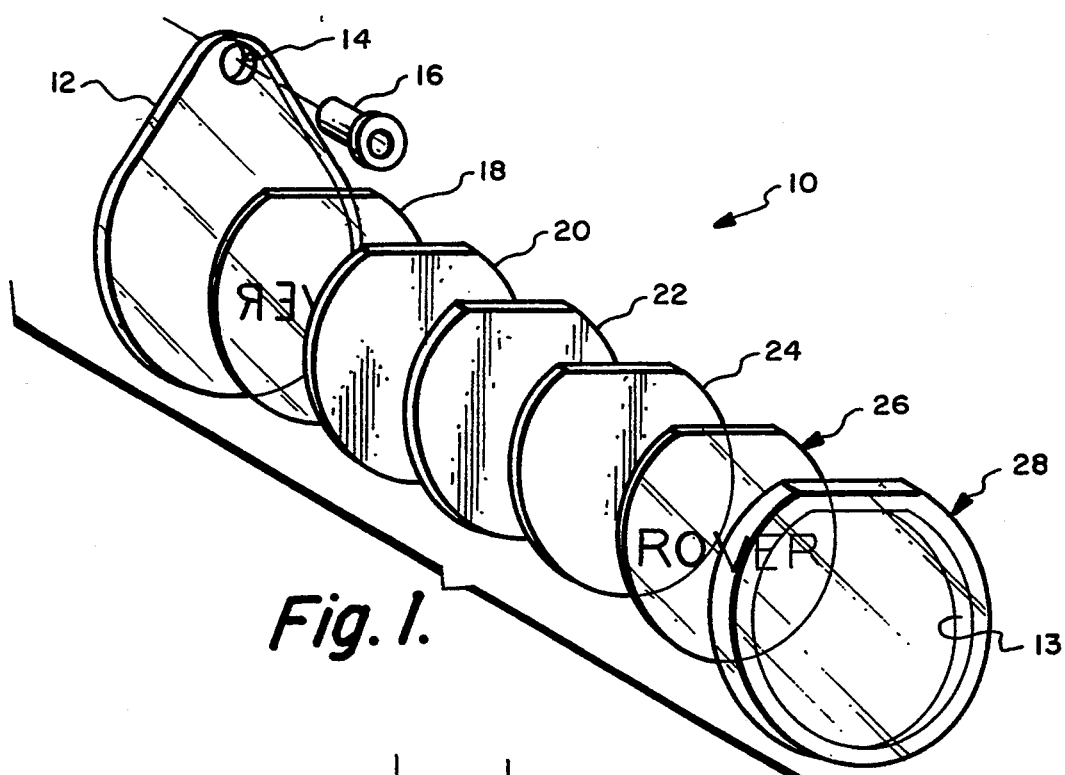
FIG. 1 is an exploded view of the entire tag structure.
Figure 2:
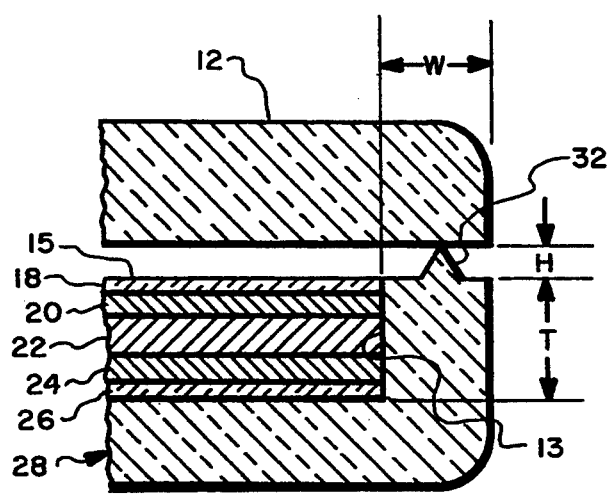
FIG. 2 is a partial sectional view of the entire tag structure taken along line AA of FIG. 1.
Figure 3:
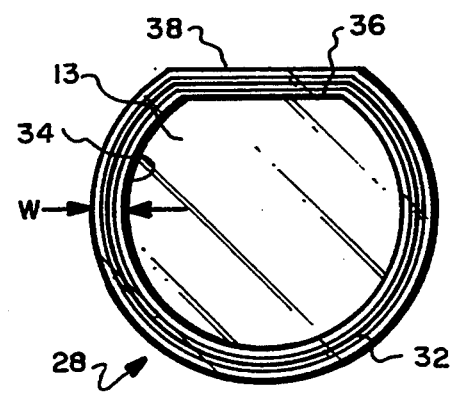
FIG. 3 is a top view in elevation of one element of the encapsulating enclosure.

Referring now to FIGS. 1-3, the tag 10 of the invention 13 and 15 not shown on FIGS. 1-3, includes a transparent encapsulating enclosure 10 formed by mating elements 12 and 28. The enclosure has a cavity 13 for receipt of a stack 15 of discs. The elements 12 and 28 are preferably formed from an optical quality, thermoplastic resin such as a polymethacrylate ester or polycarbonate resin.

Both elements 12 and 28 are preferably injection molded polycarbonate. Polycarbonate exhibits great strength, is transparent, can be formulated to possess resistance to degradation by ultraviolet light and can be ultrasonically welded. Preferably, element 12 will ultimately be ultrasonically welded to element 28. Element 12 is "tear drop" shaped containing a triangular projection so as to allow room for an aperture 14. After assembly of element 12 with element 28, ferrule 16 is installed. Ferrule 16 provides a wear resistant point of attachment of the tag to the pet via an "s" hook or split ring. The circular portion of element 12 acts as a window for viewing the cooperative display of elements 18 and 20 which are encapsulated behind this window.

Element 28 is molded so as to have a recess of depth "T". Depth "T" is chosen to accept the maximum stacking height of the stack 15 of disc elements 18, 20, 24 and 26. A depth of 0.035" is adequate for this purpose. Paper shim 22 is optional. It is incorporated in the stack 15 for stacking heights amounting to less than 0.035". Paper shim 22, when required, is necessary to keep each cooperative laminate assembly 18 and 20 as well as 24 and 26, in intimate contact with each other and with their adjacent polycarbonate windows. FIG. 3 shows a plan view of element 28 generally indicated as 28, as viewed from the cavity side. The shape of the cavity 13 can be generally circular at 34 but has a flat portion at 36. Discs 18, 20, 22, 24 and 26 will have the same profile as the cavity, namely a circular portion 34 and a flat section 36. Flat section 36 serves for registration of the discs within the cavity 13 of the element 28. Edge 38 of element 28 can be parallel with flat edge 36 of the cavity. Edge 38 serves to register element 28 within a weld fixture to properly orient it, along with all the enclosed laminates, with element 12 during the weld process.

Referring now to FIG. 2, element 28 preferably incorporates a triangular cross-section energy director 32 of height "H". The energy director lies between the perimeter of the cavity 13 and the perimeter of the part. The crest of the energy director is shown as 32 in FIG. 3. Energy director 32 is provided to guarantee a good ultrasonic weld. When the weld is made, energy director 32 liquifies and dimension "H" is reduced to nearly zero resulting in a weld width of "W".

An aspect of the invention involves the cooperative way disc 18 interacts with disc 20 and disc 24 cooperates with disc 26. Discs 18 and 26 are referred to as transparencies. Essentially, they consist of a thin (less then 0.005" thick) clear plastic sheet. Preferably, one side has a tacky coating suitable for use in automated toner or color printing. A good example of such a material is "HP LX Jet Set Series Transparency Film". This material is designed for use with a Hewlett Packard Desk Jet Printer. Such a printer is designed to be used with a computer which in turn can run desk top publishing software.

Figure 8:
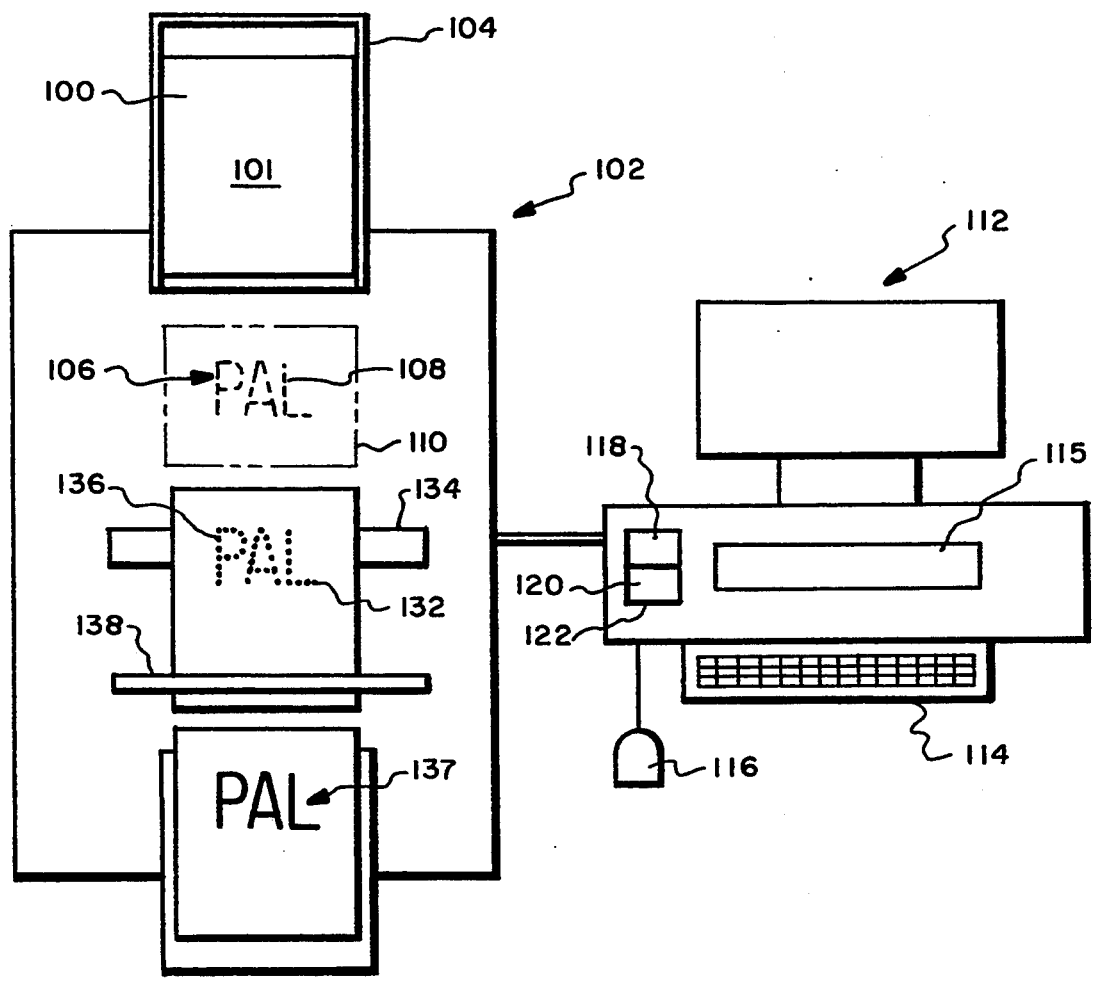
FIG. 8 is a schematic view of imprinting a transparent disc in accordance with the invention.

Referring now to FIG. 8, a transparent sheet 100 having a top surface 101 printable by a computer-driven printer 102 is placed in the feed tray 104 of the printer 102 such as a Hewlett Packard HPII laser printer. An electrostatic or colored ink image 106 of indicia 108 is formed on the surface of a drum or platen 110 by signals derived from a computer 112 containing word processing and imaging software such as a CAD program or a desk top publishing program containing both character and design capabilities. The programs are controlled by a keyboard 114 and mouse 116 connected to the central processing unit 115. A word processing program 118 and a design program 120 can be resident on a memory storage device such as a hard disk 122.

Figure 4:
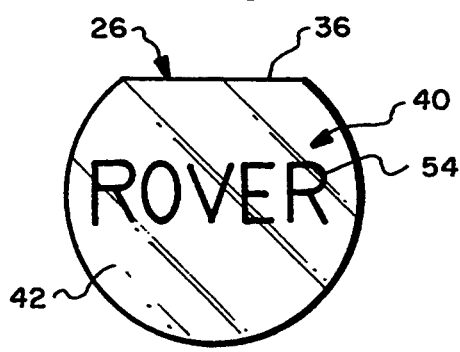
FIG. 4 is a top view in elevation of a first transparent disc imprinted with indicia.
Figure 5:
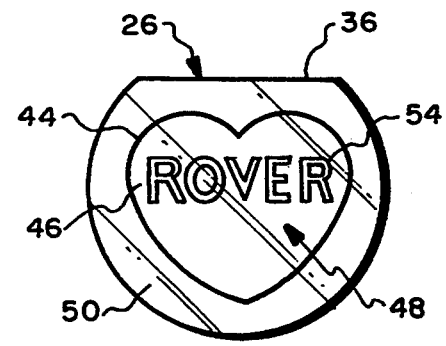
FIG. 5 is a top view in elevation of another embodiment of a transparent disc.
Figure 6:
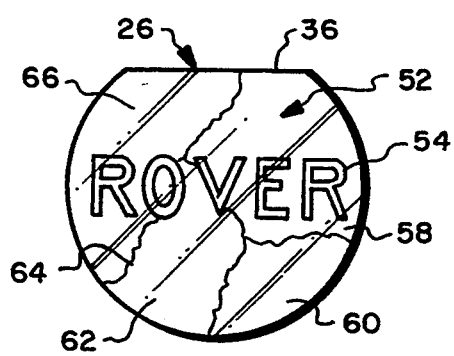
FIG. 6 is a top view in elevation of another embodiment of an imprinted disc.

The disc may be precut and the edge 36 may be aligned with the axis of the platen of the printer. Or the design program may be programmed to imprint on a sheet 128 the outline 130 of the disc and the identification indicia 54 parallel to the edge 36 as shown in FIGS. 4, 5 and 6. The publishing or design program can also simultaneously print associated designs 64 as shown in FIG. 6.

The electrostatic image 106 is transferred to the surface 101 of the sheet 100 to form an image and toner particles 132 from cartridge 134 are attracted to the image to form a toner image 136. The toner image 136 or colored ink image 137 is fixed by heat from a fuser bar 138. The disc can be cut out from the sheet 100 by stamping or cutting. Multiple discs can be imprinted with different indicia and designs on one sheet.

Transparent discs 18 and 26 can serve several functions:
  1. They will contain all indicia;
  2. They may contain artwork in the form of shapes, pictures, cartoons or patterns;
  3. They may contain areas which act as optical filters.

The composition of the transparent disc is made relatively easy via computer aided word processing and design generation. A recommended system is comprised of a 486 computer with 16 megabytes of RAM, a hard drive of 500 megabytes capacity and a scanner. A good software program to use with such a system is "Corel Draw". With such a system:
  1. New images may be created;
  2. Images may be imported by scanning and modified;
  3. Colors and opacity can be specified;
  4. Profiles can be indicated by witness marks for later die cutting of the transparencies from the parent sheet;
  5. A selection can be made from a large variety of type fonts for the indicia;
  6. A run of transparencies may be formatted for efficient printing;
  7. A separate but co-running file may be compiled for production scheduling, mailing and billing. This, while the customized indicia and artwork are being composed.

When all composition is complete, printing of the transparencies can be accomplished with a color printer operated by the same computer. Production of the indicia transparencies 18 and 26 is completed by cutting the transparencies from the parent sheet by means of a steel-rule type die.

There is a tremendous potential for artistic freedom in the above described system for the design and manufacture of the indicia discs 18 and 26. FIGS. 4, 5 and 6 demonstrate in a schematic form some of the possible variations. In FIG. 4 the indicia ROVER is printed in opaque, black characters which are generally shown as 40. The remaining area 42 of the transparent discs 18, 26 are left clear.

FIG. 5 shows a disc 26 having clear area 50, within which a heart shape 44 is disposed. It should be pointed out that the ability to portray various shapes such as heart 44, to some extent precludes the need to vary the shape of the plastic housing comprised of elements 12 and 28. The area 50 within heart shape 44 can be tinted red. It should be emphasized, that the degree of transparency of the colored areas may be varied. The percentage of transmitted light through any colored field may be varied from zero (opaque) to nearly 100%. So, by tinting area 50 red, one essentially creates an optical filter which allows a selectable amount of light of the color of the tint to pass through to the underlying background laminate (ie. 20 or 24 of FIG. 1 or 2). Within the heart are clear identifying character indicia, generally shown as 48 spelling the name ROVER.

In FIG. 6, the indicia spells the name ROVER, generally shown as 52. Each indicia will have a clear interior 54 and a gold outline 56. The rest of the transparency 26 will be broken up into areas 58, 60, 62 and 66. These areas will be tinted in separate, compatible colors. The tinting shall allow 60 percent of the impinging light through the transparency. Furthermore, no distinct line of demarcation exists as indicated by 64, between colored areas. Rather, each color will be allowed to bleed into the adjoining color. The general shape and arrangement of areas 58, 60, 62 and 66 will be of a pleasing nature.

Figure 7:
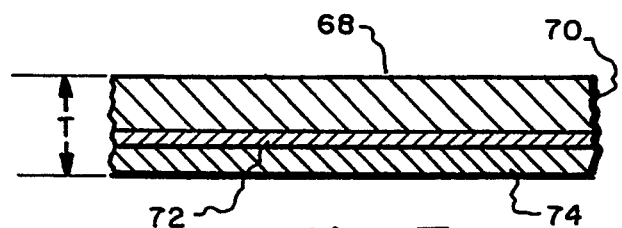
FIG. 7 is a cross-sectional view of a typical back ground disc.

Discs 20 and 24 (FIGS. 1 and 2) are termed background discs. Several background materials show promise for use with this invention. FIG. 7 shows the general cross-section of such materials. Many of these materials are already used by the display industry. Because of this, many come as sticky back with a sheet of protective paper 74 over the adhesive 72. The overall thickness (T) of these materials vary from 0.002" (no sticky back) to 0.020" (with sticky back and protective paper). Since the background materials will be in intimate contact with adjacent discs on either side, the sticky back feature is not needed. In fact, removing the protective layer would slow down assembly of the laminates. Consequently, there is no need to waste labor in removing the protective layer. The selection of (T) in FIG. 2, equal to 0.035" for the depth of the recess in element 28, allows the protective layer to be left in place for the vast majority of combinations. The sticky back is attached to, what is termed a layer 70 of an optically active material. This material has an optically active surface 68. Often the layer of optically active material 70 and surface 68 are part of a complex structure comprised of a thin film laminated on a plastic substrate. By selecting from the variety of background materials available and viewing side 68, one can arrange to have holographic patterns or pictures, diffraction, reflection, selective absorption (color), variable absorption (varying color), diffusion, florescence or phosphorescence. In some cases, more than one of the above phenomenon occur simultaneously. When a finished transparency is placed adjacent to and in intimate contact with surface 68 the following accrues:
  1. Contrasting indicia may be superimposed against the background material. Such indicia may be opaque, clear or of some semitransparent color.
  2. Ambient, white light may be blocked from reaching selected areas of the background material by applying an opaque coating over the corresponding areas of the overlying transparency.

3. Ambient white light may be allowed to reach the background material in selected areas by leaving the corresponding areas of the overlying transparency clear.

4. Ambient white light may be filtered before reaching selected areas of the background material by color tinting the corresponding areas of the overlying transparency thereby creating an optical filter.

An important advantage of the invention is that the background material needs only to be cut out (using the same steel-rule die as employed in blanking the transparencies) and assembled. The majority of the manufacturing effort goes into the transparency which is made from a material which is compatible with computer driven printers. There is a distinct manufacturing advantage to this. Most if not all of the background materials of interest are not suitable for jet or laser printing. If one chose to apply indicia or color selected areas of the background material, one would have to develop a special production process for the particular background material such as silk-screening, hot stamping, etc. One would probably have several such production lines because the background materials differ appreciably. Silk screening and the like are not cost effective in the manufacture of price competitive, customized pet identification tags. Consequently, by using the computer compatible transparency in cooperation with a background material, the invention enjoys all the advantages and none of the disadvantages of these materials from a manufacturing standpoint.

There are several background materials which may be used to advantage in this invention.

Probably the most interesting is a material called Holographic Foil. Such a material may be obtained from Transfer Print Foil, Inc. These foils may be thin (0.002" thick), electrically conductive foils or thicker, plastic coated, sticky back laminates (0.010" thick). In either case, these foils have an optically active surface which typically exhibits several features:

1. White light is reflected in a holographic, geometrical pattern. There are several varieties to choose from (ie. small rectangle matrix, herring bone, diamond faceted, circular arc, etc.).

2. Diffraction of white light into a color spectrum.

3. General specular reflectivity.

In order to appreciate how a transparency works cooperatively with a holographic foil, it is helpful to discuss what happens when such a foil is placed behind the prepared transparencies shown in FIGS. 4, 5 and 6. Referring now to FIG. 4, area 42 is clear, consequently white light passes unadulterated through the transparency to the optically active surface of the foil. The visual result in this area is a myriad of bright colors in the shape of whatever pattern was chosen for the foil. By changing viewing angle, different colors appear and different portions of area 42 show this effect. Also, area 42 can exhibit high specular reflectivity (mirror like). Finally, because of the optical nature of the surface of the holographic foil when exposed to white light, an apparent 3-D image of the pattern appears, all in this area 42. This later quality makes the opaque indicia, generally shown as 40 seem to hang in space. Three simultaneous, visual functions are exhibited by the cooperative action of the transparency-holographic foil system described in FIG. 4:

1. Indicia are displayed in good contrast;

2. An overall pleasing artistic effect is created;

3. Through general reflection and diffraction the combination has high visibility from a distance thereby serving to make the wearer visible.

If one places a holographic foil behind the transparency of FIG. 5, other effects can be observed. Area 50 and the body of the indicia, generally shown as 48, on the transparency are left clear. As in the first example, these areas allow white light to pass to the foil. Consequently, these areas exhibit holographic, reflection and diffraction effects. In short, the indicia 48 and area 50 are alive with color and are highly visible. The area 46 between the outside of the indicia to the heart shaped boundary 44 was tinted red on the transparency. Consequently, area 46 acts like an optical filter and only allows red light to reach the foil. When holographic foils are exposed to monochromatic light, the holographic and diffraction effects are negated. Nevertheless, a red image of the foil patten remains and is visible to the viewer. This colored image of the pattern is subtle and can be quite attractive.

If one places a holographic foil behind the transparency of FIG. 6, one gets another effect. Here, the overall tag does not appear as bright as the previous two examples. Areas 58, 60, 62 and 66 are tinted different colors. As a result, each area acts as a filter allowing only the light of that color to impinge on the foil. As in the previous example, only the foil pattern will be visible, but showing the color of the filter. If the boundaries 64 of the areas are indistinct and the adjacent colors are allowed to bleed together, the overall effect is that of a marbled surface. In this example, the body of the indicia are left clear on the transparency. Therefore, white light can reach the foil. The indicia are bright, show a myriad of color and a holographic depth. The indicia have a gold outline 58 which further enhances the display.

Another useful material that can be used for the surface of the background disc is known as vinyl sign making material, in either a fluorescent color such as Day-Glo or a fine textured metallic surface. The surface appears to contain fine, reflective particles which act to scatter impinging light. In short, the surface glitters.

Another useful background material is known as Safe-Glow phosphorescent material. This material is optically active in that energy from impinging light is stored and then reemitted at a later time thus showing true phosphorescence in the dark. When such background material is used behind the transparency shown in FIG. 4, area 42 will glow in the dark because this portion of the transparency was left clear allowing light to activate the phosphorescence which is reemitted through the same clear area. On the other hand, the opaque indicia 40 will appear dark against the glowing background. Once again one can see from this example how the invention allows a dual function. Written information exists simultaneously with a scheme to make the tag visible at a distance.

Other background materials exist which can work cooperatively with the transparent indicia disc include:

1. Thermochromic liquid crystal sheet
2. Simple photographs
3. Holographic photographs
4. Artwork In summary, the prior art does not show an I.D. tag that combines identification and visibility. These are achieved separately—indica on one side and reflectivity on the other side. In the invention, the transparent foreground disc containing the indica cooperates with the reflective background disc and achieves special visual effects and artistic appearance while simplifying manufacture of the tag.

It is to be realized that only preferred embodiments of the invention have been described and that numerous substitutions, modifications and alterations are permissible without departing from the spirit and scope of the invention as defined in the following claims.

I claim:

1. An identification tag comprising in combination:
   a locket having an internal cavity, said locket being formed of 2 mating sections of transparent, thermoplastic resin;
   said cavity being bounded by opposed planar faces formed on the perimeter of the sections, said faces being heated and bonded to each other and a transparent viewing portion formed on at least one of said sections over said cavity;
   a stack of sheets cut to fit said cavity being disposed in said cavity under said transparent viewing portion;
   a first sheet in said stack viewable through said window portion being formed of a transparent film having identification indicia machine printed on one of its surfaces; and
   a second sheet disposed below the first sheet having a contrasting surface viewable through said first sheet.

2. An identification tag according to claim 1 in which the identification indicia on a surface of said first sheet is formed of fused toner or color print.

3. An identification tag according to claim 1 in which the machine printed surface of said first sheet is a tacky surface.

4. An identification tag according to claim 1 in which the cavity and the sheets are circular.

5. An identification tag according to claim 1 further including means for aligning and registering the circular sheets.

6. An identification tag according to claim 5 in which the aligning and registration means includes a non-circular portion of the perimeter of the cavity and a die cut on the sheets having the shape of said non-circular portion.

7. An identification tag according to claim 6 in which the non circular portion includes a straight line and said indicia is printed parallel to said line.

8. An identification tag according to claim 2 in which the colored surface contains substances which absorb incident light and emit light at a different wavelength.

9. An identification tag according to claim 8 in which said substances are selected from light absorbing fluorescent and phosphorizing dies or pigments.

10. An identification tag according to claim 2 in which the colored surface of the second sheet reflects light at an angle to received light.

11. An identification tag according to claim 9 in which said surface of the second sheet includes a layer selected from holographic, diffraction, reflective or light scattering layers.

12. An identification tag according to claim 11 in which said layer includes particles of metal.

13. A method of manufacturing an identification tag comprising the steps of:
    machine printing a toner image or color image including identification indicia on a surface of a transparent sheet;
    forming a stack of said printed, transparent sheet and a contrasting colored sheet;
    placing said stack in the cavity of a thermoplastic enclosure having an optically clear surface disposed over the printed sheet; and
    sealing said cavity to encapsulate said stack.

14. A method according to claim 13 in which the printer is driven by a computer containing a word processing program.

15. A method according to claim 14 in which the computer is programmed with a graphics program and further including the step of driving the printer to print graphics indicia on said surface of the transparent film.

16. A method according to claim 13 in which said cavity includes means for aligning and registering the stack of sheets.

17. A method according to claim 16 further including a filler sheet in said stack to bias said sheets into intimate contact.

18. A method according to claim 15 further including the step of printing an outline of the perimeter of the cavity on said sheet and die cutting said sheet along said outline.

19. A method according to claim 14 in which the opposed faces are sealed by sonic welding.

20. A method according to claim 14 in which the stack includes a further set of printed transparent sheet and colored sheet facing a direction opposite of the other transparent sheet and color sheet.

* * * * *